United States Patent
Watkins et al.

(10) Patent No.: US 7,599,843 B2
(45) Date of Patent: Oct. 6, 2009

(54) TELEMATICS UNIT AND METHOD FOR OPERATING

(75) Inventors: Gary A. Watkins, Royal Oak, MI (US); Christopher L Oesterling, Troy, MI (US); Wylie R Burt, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 1285 days.

(21) Appl. No.: 10/678,393

(22) Filed: Oct. 3, 2003

(65) Prior Publication Data

US 2005/0075892 A1    Apr. 7, 2005

(51) Int. Cl.
*G06Q 10/00* (2006.01)
*G06Q 30/00* (2006.01)
(52) U.S. Cl. ................................ 705/1; 705/22; 705/28
(58) Field of Classification Search .................. None
See application file for complete search history.

(56) References Cited

U.S. PATENT DOCUMENTS

| 5,742,668 | A * | 4/1998 | Pepe et al. | 455/415 |
| 6,615,186 | B1 * | 9/2003 | Kolls | 705/26 |
| 2002/0091706 | A1 * | 7/2002 | Anderson et al. | 707/104.1 |
| 2005/0222933 | A1 * | 10/2005 | Wesby | 705/36 |

* cited by examiner

*Primary Examiner*—Tan Dean Nguyen
*Assistant Examiner*—Debra Antonienko

(57) ABSTRACT

A method of operating a telematics unit comprising the steps of: first operating the telematics unit in a logistical support mode containing a first set of operations assisting tracking of at least one of (a) the telematics unit and (b) a vehicle containing the telematics unit through storage and travel; and second operating the telematics unit in a customer service mode containing a second set of operations supporting a customer associated with the vehicle, wherein the first set of operations contains at least one operation unique from the second set of operations.

14 Claims, 4 Drawing Sheets

500

TELEMATICS UNIT AND METHOD FOR OPERATING

TECHNICAL FIELD

This invention relates to a telematics unit and method for operating a telematics unit.

BACKGROUND OF THE INVENTION

Telematics units embedded within mobile vehicles provide subscribers with connectivity to a telematics service provider (TSP). The TSP provides the subscriber with an array of services ranging from emergency call handling, stolen vehicle recovery and diagnostic code uploading to making restaurant reservations. In a known example, telematics units are provisioned and activated at a point of sale when a subscriber purchases a telematics equipped vehicle. Upon activating, the telematics unit can be utilized to provide a subscriber with telematics services.

As vehicles leave a manufacturing facility, vehicle logistics, including vehicle tracking and inventory management, is largely implicit. Vehicle delivery tracking typically utilizes logistical support infrastructure tied to vehicle manufacturer shipping systems. Many times exact vehicle position is inferred based upon shipping schedules, manifests, etc. In another example, special logistical support devices, such as radio frequency identification tags may be utilized to track vehicles entering, exiting, or passing through specific locations. Sensors interact with the radio frequency identification tags and network computers to update database entries relating to the vehicle.

SUMMARY OF THE INVENTION

Advantageously, this invention provides a method and system for operating a telematics unit.

Advantageously, according to an example implementation, a method of operating a telematics unit comprises the steps of: operating the telematics unit in a logistical support mode containing a first set of operations assisting remote tracking of at least one of (a) a telematics unit and (b) a vehicle containing the telematics unit through storage and shipment; and operating the telematics unit in a customer service mode containing a second set of operations supporting services to the customer associated with the vehicle, wherein the first set of operations contains at least one operation unique from the second set of operations.

DESCRIPTION OF AN EXEMPLARY EMBODIMENT

Figure 1:
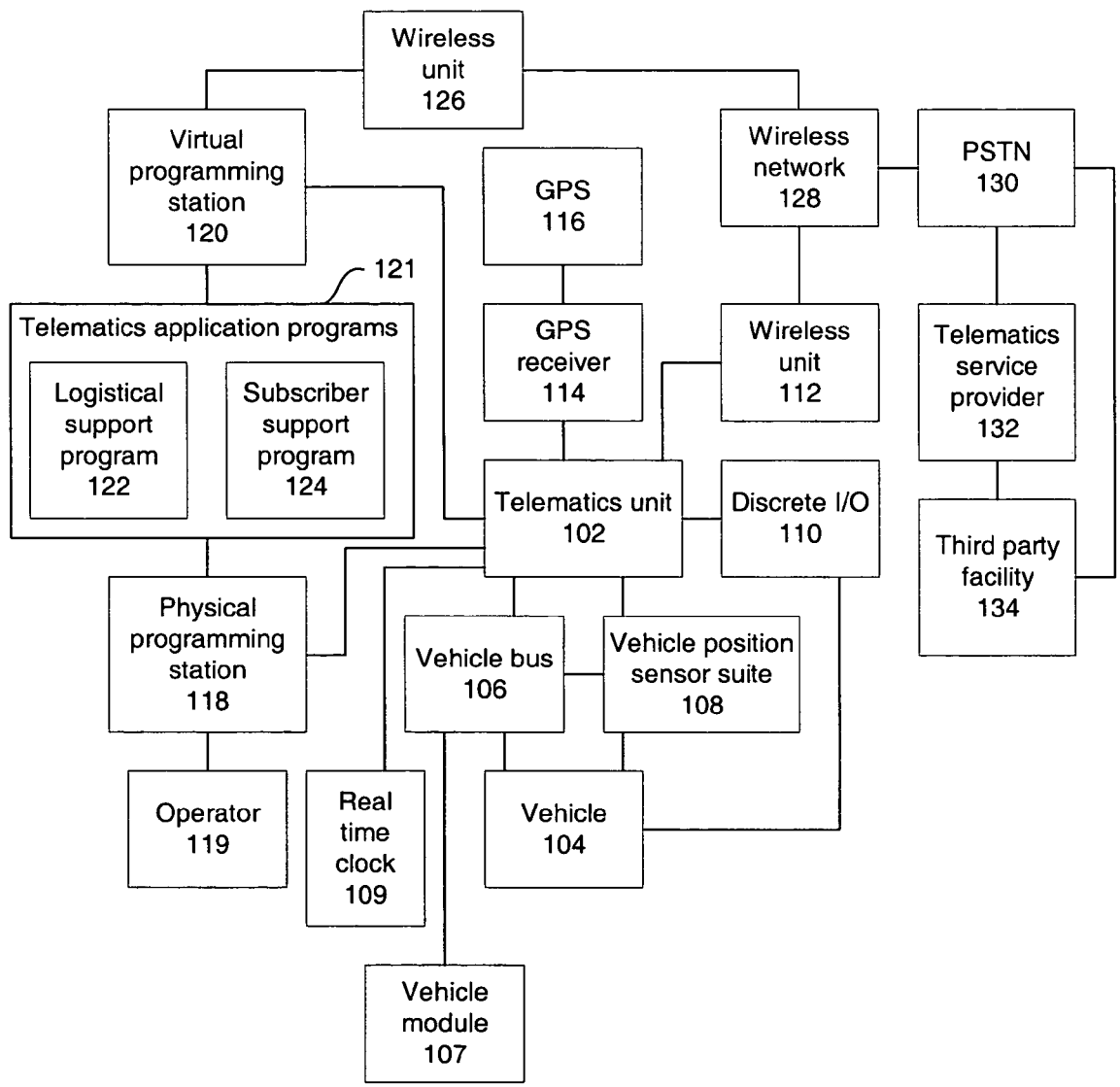
FIG. 1 illustrates an example system for implementing this invention.

FIG. 1 illustrates an example system at 100 including a telematics unit 102 associated with a vehicle 104. As a telematics unit 102 equipped vehicle 104 is being prepared to exit an assembly line, the telematics unit 102 is connected to a physical programming station 118. The physical programming station 118 contains multiple computer programs, referred to as telematics application programs 121. Telematics application programs are selected for download to and installation within the telematics unit 102 either automatically or by an operator 119.

The telematics application programs 121 within the physical programming station contain specific functionality to be executed when the programs are active within the telematics unit 102. In this example, two telematics application programs 121 are provided, a logistical support program 122 and a subscriber support program 124. It will be understood by those skilled in the art that the programs 122 and 124 may be object code programs flashed in to memory in the telematics unit 102, or applets for running on a virtual machine in telematics unit 102, or any other form for controlling the function of telematics unit 102 in the modes described herein.

In an alternative embodiment, the telematics unit 102 is manufactured with the programs 122 and 124 included at the component level, eliminating the need to download programs at the vehicle assembly plant.

In yet another example, the telematics unit 102 receives its programs 122 and 124 through connection to a virtual programming station 120. The virtual programming station 120 contains or has access to the telematics application programs 121, which it downloads and installs within telematics unit 102 in lieu of a physical programming station 118 and operator 119.

In an example use of virtual programming station 120, when the telematics unit 102 is energized at a manufacturing facility and ready to accept a telematics application program 121, the virtual programming station 120 establishes a connection with the telematics unit 120. The connection from the virtual programming station 120 to the telematics unit 120 may be a physical, wired connection or a short range wireless connection, utilizing Bluetooth, 802.11, or other short range wireless technology.

The virtual programming station 120 also establishes a connection with the telematics service provider 132 via a wireless unit 126, a wireless network 128, and the PSTN (Public Switched Telephone Network) 130. The telematics service provider 132 provides access to the telematics application programs 121, including the logistical support program 122 and subscriber support program 124. The telematics service provider 132 determines which of the telematics application programs 121 to download and install within the telematics unit 102. After a telematics application program 121 is downloaded and installed within the telematics unit 102, the connection between the virtual programming station 120, the telematics unit 102, and the telematics service provider 132 is terminated.

For a first mode of operation, the logistical support program 122 contains instructions for the telematics unit 102 to operate in a logistical support context. Logistical support context comprises collecting and reporting data. The date includes typically vehicle position, identification, time and date, and may also include additional information, such as warranty related data and any other data available through the specific implementation and desired for the logistical support mode. Example warranty related data comprises vehicle module diagnostic codes, battery voltage, security system status, and analog and digital signals from vehicle discrete input and output devices.

Warranty data is collected via messages received from a plurality of vehicle control modules 107 by way of the vehicle bus 106. For example, one such vehicle control module may be a powertrain control module that controls and monitors a vehicle powertrain system. A powertrain system is comprised of a motor, transmission, and interconnecting electrical and mechanical components.

Collected data may be stored within the telematics unit 102 memory for off-line extraction or for periodic or event driven reporting to a telematics service provider 132 or third party (or logistics support) facility 134. Alternatively, the data may be collected and transmitted in the same operation, eliminating storage in the memory of telematics unit 102.

Associated with the telematics unit 102 is a real time clock 109. The real time clock 109 maintains and produces a signal that provides accurate time and date information. The time and date information provided by the real time clock 109 is used to record in the telematics unit 102 memory the time and date associated with a periodic or asynchronous event. The time and date information provided by the real time clock 109 is synchronized in a known manner with the time information available from the GPS (Global Positioning System) 116 via the GPS receiver 114, when GPS information is available.

Vehicle position is determined by activating a GPS (Global Positioning System) receiver 114 connected to the telematics unit 102. Upon activation, the GPS receiver 114 acquires signals from the GPS constellation 116 then calculates the GPS receiver 114 velocity and current position, which is consequently the velocity and position of the vehicle that the telematics unit 102 is physically attached to. Vehicle position may also be determined from a vehicle position sensor suite 108 if the vehicle is so equipped. The vehicle position sensor suite 108 is comprised of sensors well known to skilled practitioners in the art. The vehicle position sensor suite 108 associated with a vehicle 104 may communicate directly with the telematics unit 102 or communicate via a vehicle bus 106.

Associated with the vehicle 104 and telematics unit 102 are discrete input and output devices 110. Discrete input and output devices 110 provide digital and analog information to the telematics unit 102 and is comprised of sensors well known to skilled practitioners in the art.

The telematics unit 102 communicates with a telematics unit service provider 132 via a wireless unit 112 associated with the telematics unit 102, a wireless network 128, and the PSTN (Public Switched Telephone Network) 130. The telematics unit may also communicate with third party facility 134. Example third party facilities 134 are vehicle tracking and monitoring facilities, manufacturing facilities, data collection centers, or vehicle dealers.

For example, in a first mode of operation with logistical support functionality, the telematics unit 102 may contact the telematics service provider, which receives time, position and other data from the vehicle as part of the logistics support activity supporting the vehicle manufacturer to vehicle dealer delivery system. The logistical support may continue while the vehicle is at the dealer, providing information supporting management of the dealer vehicle stock. These contacts with the telematics service provider are triggered by functionality included in logistical support program 122, examples of which are described further below.

In another example of in the first mode, the telematics unit invoking logistical support program 122 contacts another service center 134 that focuses on logistical support for the vehicle manufacturer and its distribution network. In this example, the unit 102 is then enabled to connect to the telematics service provider only after the second mode of operation to support customer telematics services is invoked when the vehicle is delivered to a customer.

As discussed herein, the telematics unit 102 is also programmed with a subscriber support program 124 from the set of telematics application programs 121. The subscriber support program 124 contains instructions for the telematics unit 102 to operate in a subscriber support context or mode. Subscriber support context is comprised of responding to telematics unit button presses or utterances that support features such as emergency aid, personal calling, navigation instructions, and concierge services. Typical examples of these features are well known to those skilled in the art, and need not be set forth in detail herein.

Figure 2:
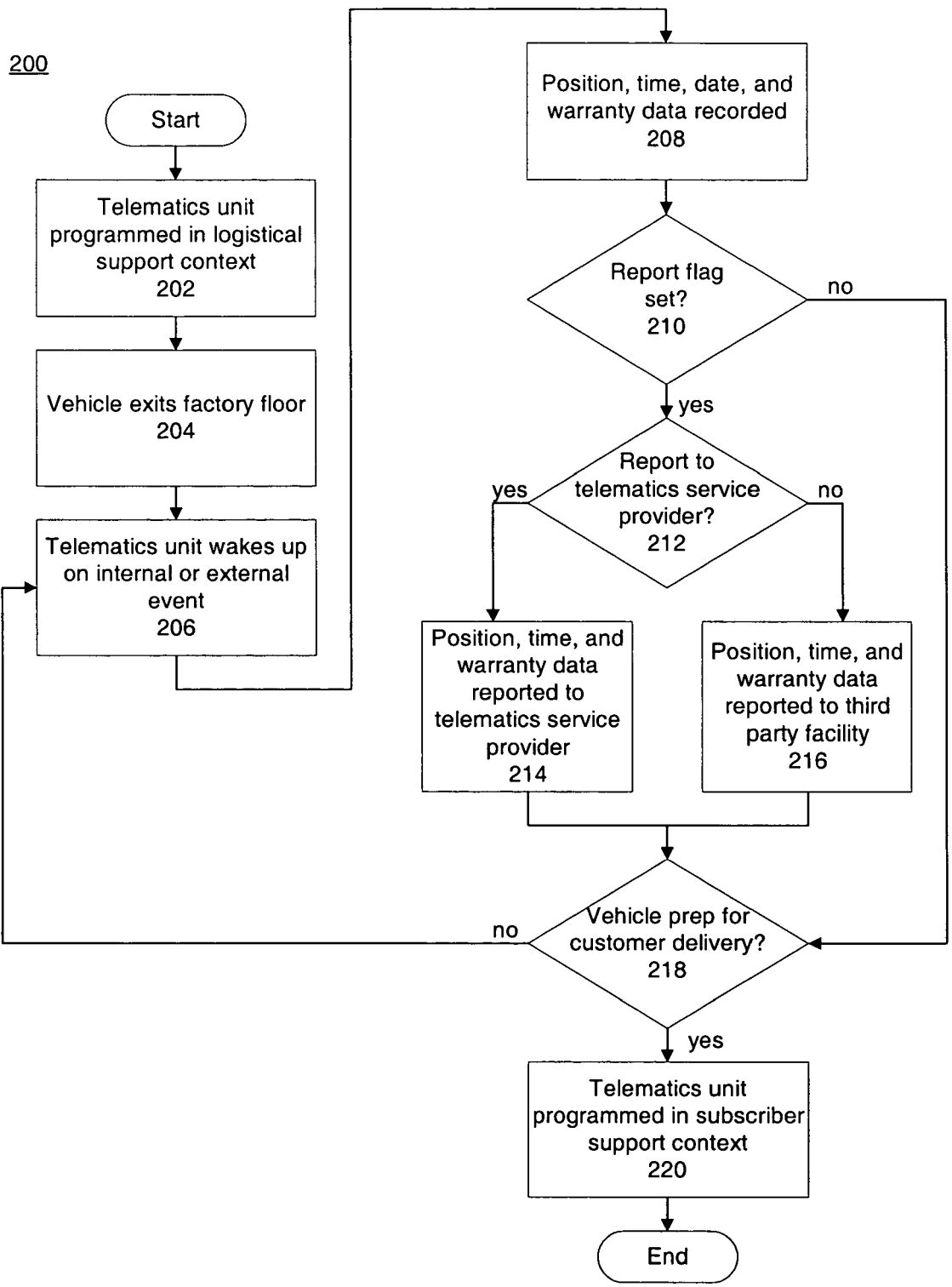
FIG. 2 illustrates an example method steps and example functions of the system shown in FIG. 1.

FIG. 2 illustrates example method steps and functions at 200. A telematics equipped vehicle (FIG. 1, 104) is programmed to operate in a logistical support context 202. After programming is complete, the vehicle exits the factory floor or manufacturing facility 204. The telematics unit (FIG. 1, 102) associated with the vehicle (FIG. 1, 104) is now enabled to collect and report data as it travels from a manufacturing facility to a dealer facility.

While operating in a logistical support context, the telematics unit is activated upon internal or external events 206. The method in which the telematics unit is activated is determined by a configurable parameter. An example internal event is a timer interrupt, where the timer interrupt sends an activation signal to the telematics unit causing the telematics unit to execute the routines within the logistical support program. The executing routines cause the GPS receiver to activate and attempt to acquire signals from the GPS constellation to determine current position. Alternatively, the logistical support program may access the vehicle position sensor suite in order to determine current position. If the current position is acquired, then the position is logged in telematics unit memory 208. The time and date associated with the acquired position is then recorded 208. When the time and date are successfully recorded, the logistical support program may also acquire other desired data by examining and recording vehicle module messages via the vehicle bus 208.

In one example, the GPS data acquired during the wake-up periods is used to determine movement of the vehicle, allowing logging of locations and travel during vehicle delivery. This information triggers calls to the service center supporting logistics on a predetermined basis. For example, when the first and second most recent positions indicate different geographical positions, and the second and third most recent positions were the same, new movement of the vehicle is determined and may be reported as an indication that the vehicle began movement through the logistical delivery system. And when the first and second most recent positions are the same, while the second and third were different, a cessation of travel may be inferred, and reported through to the service center supporting logistics.

While there are common features to both modes of operation, some of the functions, such as the time or location based reporting to support logistics, are not repeated in the second mode supporting telematics customer service.

If the position, time and date, and/or other data cannot be accessed due to GPS blockage or lack of electrical power to vehicle modules, the logistical support program may activate a software timer to attempt to acquire data every M minutes. The value of M is variable, with the value of M contained in and downloaded with the logistical support program. In this example the value of M is set to a default of 10 minutes. The telematics unit, activating every 10 minutes, will attempt to acquire data every N retry cycles. The value of N is variable, with the value of N contained in and downloaded with the logistical support program. In this example, the value of N is set to a default of 3 retries. If the data is not acquired within 3 retry cycles, the data acquisition algorithm reverts back to the original periodic interval supplied by the logistical support program.

Additionally, if the position, time and date, and/or other data cannot be accessed due to GPS blockage or lack of electrical power to vehicle modules, the logistical support program instructs the telematics unit to acquire data upon the next vehicle ignition cycle. Vehicle subsystems, such as vehicle modules, are fully energized and active during the period of an ignition cycle when the vehicle is running. During this time, vehicle position is determined and recorded if no GPS blockage or outage occurs. Time and date are read from the real time clock (FIG. 1, 109) and recorded, and messages issued from vehicle modules are read from the vehicle bus and recorded 208. This sequence of steps cancels the software timer data acquisition cycle and associated retries.

In an example implementation, the logistical support program contains several configuration parameters, one such parameter being a report flag. The report flag is binary, where the one state is interpreted as being set or true, and the zero state as reset or false. If the report flag is set 210, then the logistical support program examines another configuration parameter to determine when to telematically report the stored data 212. If the configuration parameter indicates that the data is to be sent to the telematics service provider 214, then the stored data is packetized and transmitted to the telematics service provider where the data is further managed for the logistical support function, for example, by updating shipment databases with new vehicle locations, etc. If the configuration parameter indicates that the data is to be sent to another location then the data is packetized and transmitted to that location 216 to support logistics.

It is noted that the telematics unit may be activated via an event, such as ignition cycle, door handle access, security system stimulus, or other event specified by the configuration parameter. Any such event can be used to trigger a logistics report function in which the telematics unit 102 contacts the service center and uploads data as described herein.

When a vehicle is prepared for customer delivery 218, usually at a dealership, the telematics unit logistical support program mode is disabled and the subscriber support program mode is enabled 220. The switch in modes may be an internal software flag or may be a physical downloading of the subscriber support mode software into the telematics unit. Now in the second mode, the telematics unit behaves in a subscriber support context and is ready to be provisioned for a specific subscriber. Alternatively the telematics unit 102 may be configured to disable logistic support mode and enable subscriber support by activating a subscriber account associated with the vehicle.

Figure 3:
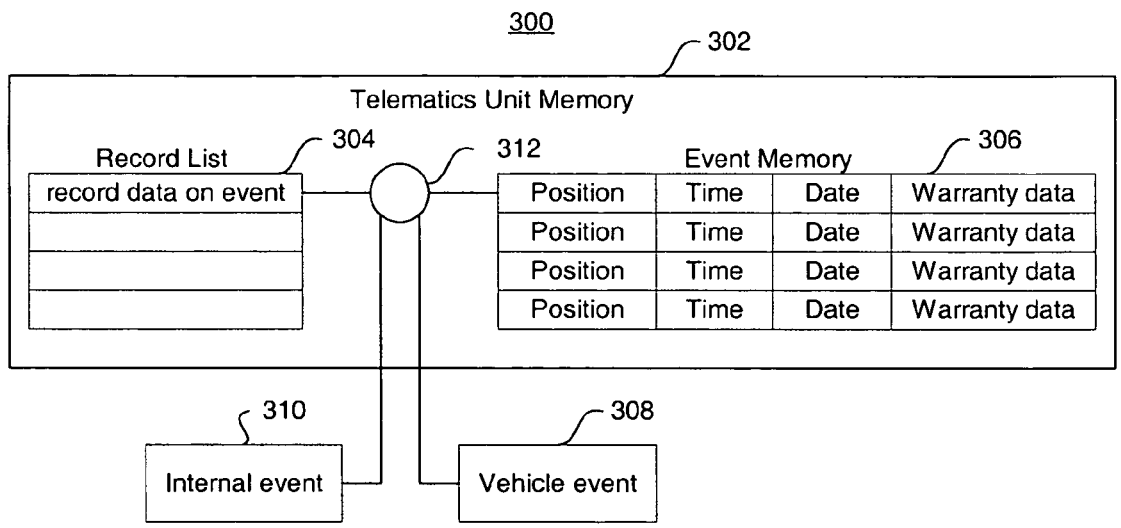
FIG. 3 illustrates an example memory arrangement.

FIG. 3 illustrates an example memory arrangement of the present invention at 300. During initialization, the logistical support program places parameters within a record list 304 residing in telematics unit memory 302. The parameters within the record list 304 instruct the logistical support program to record data on internal events 310 or external events 308. Internal events 310 are comprised of timer interrupts or interrupts generated internally by the telematics unit (FIG. 1, 102). Vehicle events 308 are comprised of ignition state change detection or other signals issued by vehicle modules (FIG. 1, 107) or discrete inputs and outputs (FIG. 1, 110).

When an internal or vehicle event occurs, the event is retained in a temporary storage buffer 312, where the event is compared to the parameters resident in the record list 304. The parameters in the record list 304 instruct the logistical support program to acquire and record position, time, date, and any other data desired by the system designer in the event memory 306 data structure within the telematics unit memory 302.

Figure 4:
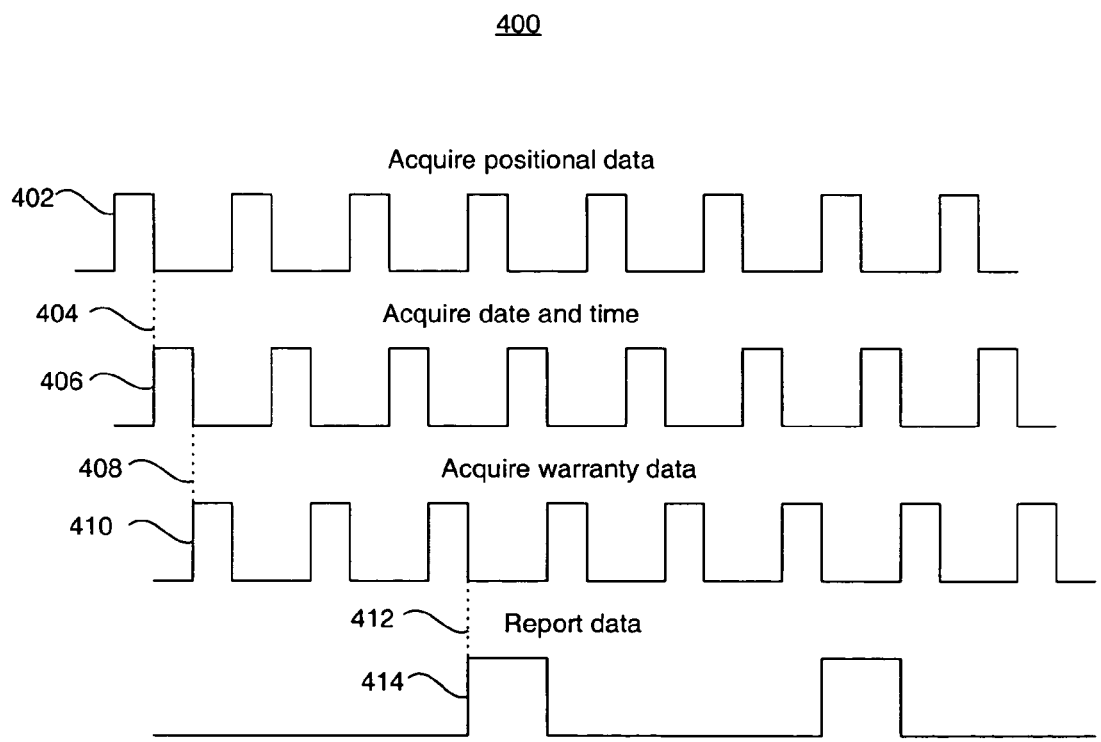
FIG. 4 illustrates an example timing arrangement.

FIG. 4 illustrates an example timing arrangement during logistical mode at 400. When an internal or vehicle event is detected, the logistical support program accesses the GPS receiver (FIG. 1, 114) in order to acquire current vehicle position. If the vehicle position is acquired 402, the position is stored in the position field of the event memory (FIG. 3, 306) data structure within the telematics unit memory (FIG. 3, 302). If the position data is not acquired, a null, defined as a binary zero, is stored in the position field.

When the current vehicle position is stored in memory 404, the real time clock (FIG. 1, 109) associated with the telematics unit (FIG. 1, 102) is accessed. The logistical support program retrieves the current data and time 406 and updates the time and date fields within the event memory (FIG. 3, 306) data structure. Upon acquiring and storing time and date data 408, warranty data is acquired 410. Warranty data is accessed directly from discrete inputs or outputs connected to the vehicle (FIG. 1, 110) and telematics unit (FIG. 1, 102) or from vehicle modules (FIG. 1, 107) via the vehicle bus (FIG. 1, 106).

Depending on the configuration parameters, a number of acquisition cycles occur before the data is reported to a telematics service provider (FIG. 1, 132) or third party facility (FIG. 1, 134). Upon acquisition of warranty data 410, and depending on the state of the report flag (FIG. 2, 210), a trigger is issued 412 to a routine within the logistical support program to format and report the collected data 414 to the telematics service provider or third party facility.

Figure 5:
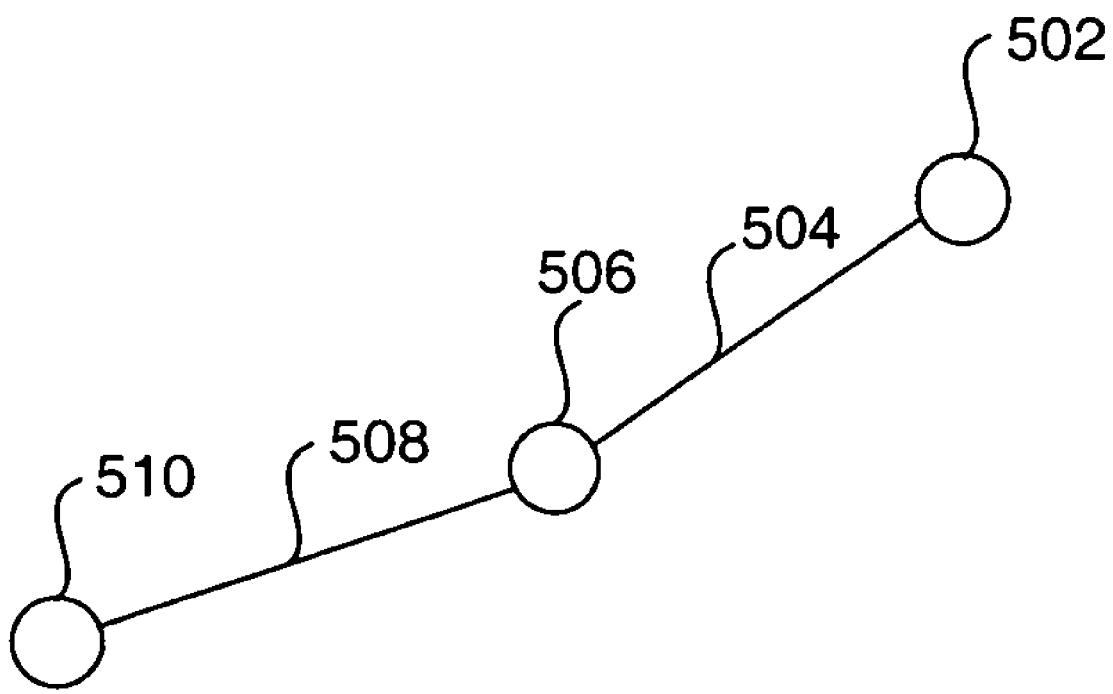
FIG. 5 illustrates an example vehicle shipment path from a source to a destination through transfer points.

FIG. 5 illustrates an example vehicle shipment path from a source to a destination through transfer points in accordance with the present invention at 500. As a shipment of vehicles leave a manufacturing facility 502, the shipment traverses a path 504 to a transfer point 506. Associated with a shipment of vehicles is an itinerary that states the date and time of the arrival of the shipment at the transfer point.

In one example, when a telematics unit (FIG. 1, 102) is operating in a logistical support context, the telematics unit (FIG. 1, 102) is programmed to activate at a predetermined date and time coinciding with the arrival date at a transfer point 506 indicated by the itinerary. Once activated, the telematics unit (FIG. 1, 102) acquires position via the GPS receiver, establishes a call to a TSP (Telematics Service Provider) (FIG. 1, 132), and sends the date, time, position, and VIN (Vehicle Identification Number) to the TSP (FIG. 1, 132). The date, time, position, and VIN are stored at the TSP (FIG. 1, 132) and then compared to the transfer points indicated on the itinerary. Alternatively, the date, time, position, and VIN may be sent to a third party facility (FIG. 1, 134) for itinerary comparison. Server based reports on position and itinerary deviations are easily made by comparing the received logistic information from the telematics units and the shipment schedules.

The telematics unit (FIG. 1, 102) is programmed to activate on the date and times along the complete path from the manufacturing facility 502 along the path 504 to transfer point 506, proceeding along the path 508 to a terminal transfer point 510. Alternatively, if an ignition cycle occurs at transfer points 502, 506, and 510, the telematics unit (FIG. 1, 102) activates. Once activated, the telematics unit (FIG. 1, 102) acquires position via the GPS receiver, establishes a call to a TSP (Telematics Service Provider) (FIG. 1, 132), and sends the date, time, position, and VIN (Vehicle Identification Number) to the TSP (FIG. 1, 132).

Alternatively, if complete transfer point information is not available, an itinerary may indicate a terminal transfer point 510 where vehicles are unloaded and distributed to retail or rental facilities. The telematics unit (FIG. 1, 102) will activate on the date and time coinciding with the expected arrival time of the vehicle shipment at the terminal transfer point 510. Once activated, the telematics unit (FIG. 1, 102) acquires position via the GPS receiver, establishes a call to a TSP (Telematics Service Provider) (FIG. 1, 132), and sends the date, time, position, and VIN (Vehicle Identification Number) to the TSP (FIG. 1, 132).

Alternatively, if an ignition cycle occurs at transfer point 510, the telematics unit (FIG. 1, 102) activates. Once activated, the telematics (FIG. 1, 102) unit acquires position via the GPS receiver, establishes a call to a TSP (Telematics Service Provider) (FIG. 1, 132), and sends the date, time, position, and VIN (Vehicle Identification Number) to the TSP (FIG. 1, 132).

In yet another alternative, the telematics unit 102 during a wake-up event in logistical support mode may receive commands from the service center and report data or perform other functions in response to the commands received. In this example, commands received from the service center are received as specific data requests or function requests.

The invention claimed is:

1. A method of operating a telematics unit within a vehicle comprising the steps of:
   first operating the telematics unit in a logistical support mode that utilizes a first set of operations that assists in remote tracking of the vehicle containing the telematics unit and that tracks shipment and delivery of the vehicle prior to a sale of the vehicle to a customer,
   second operating the telematics unit in a separate customer service mode that utilizes a second set of operations that supports a customer associated with the vehicle and that provides support after the sale of the vehicle to the customer, and
   activating a customer account and triggering a change from operating the telematics unit in the logistical support mode to a customer service mode.

2. The method of claim 1, wherein, during the first operating in the logistical support mode, the telematics unit reports data containing at least vehicle position to one of (a) a telematics service provider, and (b) a dedicated logistical support service center.

3. The method of claim 1, wherein the logistical support mode is maintained while the vehicle is transported to and maintained at a point of sale location.

4. The method of claim 1 further comprising: changing from the logistical support mode to the customer service mode upon sale of the telematics unit equipped vehicle.

5. The method of claim 1 further comprising in the logistical support mode: collecting warranty data, wherein warranty data comprises vehicle module diagnostic codes, battery voltage, vehicle bus signals, vehicle security system status, and analog and digital signals from vehicle devices.

6. The method of claim 5, further comprising: reporting collected data periodically to at least one of a telematics service provider and a logistical support center.

7. The method of claim 1, comprising the step of: during the logistical mode, reporting at least vehicle position based on at least one of time event triggers generated within the telematics unit, and location events triggers sensed by the telematics unit, and vehicle event triggers sensed by the telematics unit.

8. The method of claim 1, also comprising: during the logistical support mode, initiating a timer based retry strategy in response to a failure of the telematics unit to acquire a predetermined set of data.

9. A method of operating a telematics unit within a vehicle, comprising the steps of:
   (a) activating the telematics unit;
   (b) executing a logistical support program with the telematics unit, where the logistical support program includes instructions for collecting and reporting data regarding the vehicle and is executed following activation of the telematics unit but before a sale of the vehicle to a customer;
   (c) activating a subscriber account for the telematics unit; and
   (d) executing a customer service program with the telematics unit, where the customer service program includes instructions for responding to user requests and is executed following activation of the subscriber account.

10. The method of claim 9, wherein step (b) is executed after manufacture of the vehicle and before the vehicle is delivered to a dealership.

11. The method of claim 9, wherein step (d) is executed after the vehicle is delivered to a dealership.

12. The method of claim 9, wherein the logistical support program of step (b) includes instructions for collecting and reporting data and the data includes at least one member selected from the group consisting of: vehicle position data, vehicle identification data, or vehicle warranty data.

13. The method of claim 9, wherein the customer service program of step (d) includes instructions for responding to a user request and the user request includes at least one member selected from the group consisting of: emergency aid requests, personal calling requests, navigation requests, or concierge service requests.

14. The method of claim 9, wherein step (c) further comprises activating a subscriber account for the telematics unit at a point of sale of the vehicle.

* * * * *

UNITED STATES PATENT AND TRADEMARK OFFICE
CERTIFICATE OF CORRECTION

| | | |
|---|---|---|
| PATENT NO. | : 7,599,843 B2 | Page 1 of 1 |
| APPLICATION NO. | : 10/678393 | |
| DATED | : October 6, 2009 | |
| INVENTOR(S) | : Watkins et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1765 days.

Signed and Sealed this

Twenty-eighth Day of September, 2010

David J. Kappos
*Director of the United States Patent and Trademark Office*